Aug. 22, 1944.  J. D. TESSIER  2,356,712
GAFF HOOK
Filed May 17, 1943
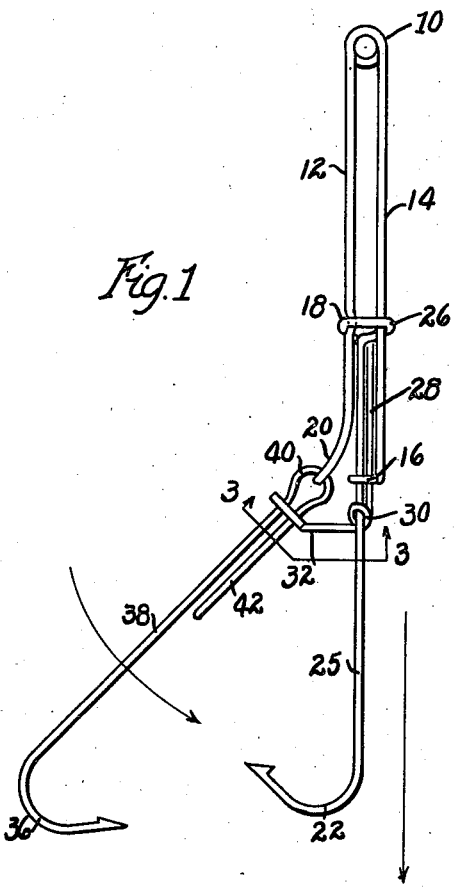
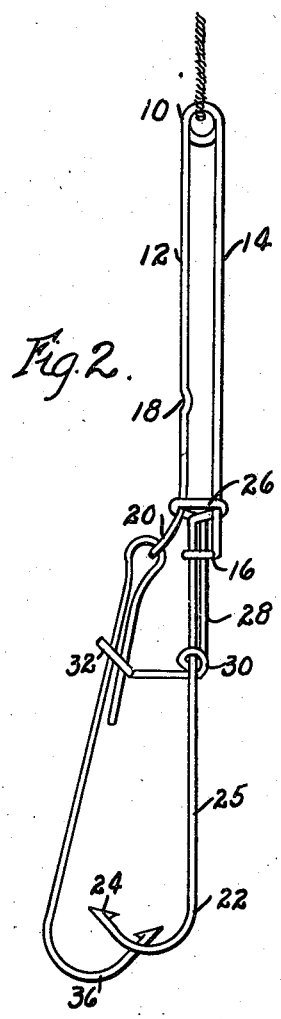
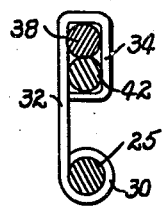
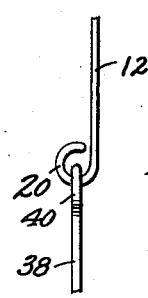
Inventor.
J. D. Tessier.
By
Charles R. Ray
Attorney.

Patented Aug. 22, 1944

2,356,712

UNITED STATES PATENT OFFICE 2,356,712

GAFF HOOK

Joseph D. Tessier, Worcester, Mass.

Application May 17, 1943, Serial No. 487,220

5 Claims. (Cl. 43—37)

This invention relates to fish hooks in general and more in particular to quick-acting gaff hooks.

Objects of the invention include the provision of a frame, a rectilinearly movable fish hook slidable on the frame, a gaff hook pivoted to the frame, and a cam on the rectilinearly movable hook cooperating with the pivoted gaff hook to swing the latter in towards the former as the same is moved relative to the frame by the fish as it strikes, so that the fish is gripped by two hooks acting scissor-fashion with the barbs facing each other at the ends of the blades of the scissors.

Further objects of the invention include the provision of a practical three-piece gaff hook for fish, said hook being of a relatively simple nature but at the same time positive and easily actuated by the fish itself.

Other objects and advantages of the invention will appear hereinafter.

Reference is to be had to the accompanying drawing in which

Fig. 1 shows the gaff hook set in baited condition;

Fig. 2 shows the hooks as they appear in hooking the fish;

Fig. 3 is an enlarged section on line 3—3 of Fig. 1 and showing the same; and

Fig. 4 is a detail view of a part of the device.

The gaff hook of the present invention includes a frame having an eye 10 for the line and a pair of legs 12 and 14 respectively. These legs are generally parallel but leg 14 terminates in an eye 16 formed by looping the material of the frame back on itself. Leg 12 is provided with a depression 18 for a purpose to be described intermediate its ends and terminates in an angular foot leading away from leg 14, this foot having means 20 for a purpose to be described.

A fish hook 22 having a barb 24 is provided with a straight shank 25 located between legs 12, 14 and having an eye 26 which includes the legs and extends transversely thereof. The eye 26 continues reversely and parallel to the shank as at 28, and an eye 30 is provided in part 28 to provide a support for a cam element 32 shown in detail in Fig. 3.

Cam element 32 may be formed by bending the end of part 28 in the manner shown in Fig. 3 to provide an eye 34 for a purpose to be described. This eye however must be inclined as shown in Figs. 1 and 2.

The third and last member of the novel fish hook comprises the gaff hook 36 which is provided with a shank 38 at one end of which an eye 40 is formed. The material of the shank continues reversely to form a part 42 parallel to but shorter than the shank. Eye 40 is held by means 20 and swivels with respect thereto so that the gaff hook 36 may move from Fig. 1 position to Fig. 2 position.

Shank 38 of the gaff hook and its parallel part 42 are slidable in the cam 32 and the gaff hook cannot twist as the cam closely guides the shank and part 42.

The hook 22 is baited and set so that eye 26 rests in depression 18 just enough to lightly and releasably hold the hook in set position. The cam 32 forces the gaff hook 36 to remain in Fig. 1 position.

When a fish strikes the bait, the hook 22 is pulled, thus sliding eye 26 down relative to legs 12, 14 and also sliding the cam down along the shank of the gaff hook. This action clearly brings the latter in towards the hook 22 and if the action continues far enough the barbs cross, firmly hooking the fish. The directions of the arrows in Fig. 1 illustrate the motions involved. The more the fish struggles, the harder it is held. Also, the fish will not swallow the hook 22 inasmuch as the gaff hook will impale the fish before it can swallow. The entire hook comprises only three parts: the frame and the two hooks.

Having thus described my invention and the advantages thereof, I do not wish to be limited to the details herein disclosed, otherwise than as set forth in the claims, but what I claim is:

1. A gaff fish hook comprising a frame, a bait hook having a shank slidable on the frame, means to restrain the motion of the bait hook relative to the frame to a rectilinear direction, an open cam inclined relative to the bait hook shank, and a gaff hook pivoted to the frame and passing through the cam, the cam being of a shape to prevent twisting of the gaff hook relative to the bait hook.

2. A gaff fish hook comprising a frame for attachment to a line, said frame terminating in means forming a pair of openings, a bait hook slidable in one opening, a gaff hook pivoted to the means forming the other opening, and an eye carried by the bait hook, said gaff hook passing through said eye, the latter lying in a plane inclined to the bait hook.

3. A gaff fish hook according to claim 2 wherein said eye is of a shape to restrain the bait hook to a rectilinear motion relative to the frame.

4. A gaff fish hook comprising a bait hook, a frame on which the bait hook is slidable, a gaff hook pivoted to the frame, means on the bait hook to move the gaff hook towards the bait hook upon sliding movement of the latter relative to the frame, and means to releasably hold the bait hook in set relation to the frame.

5. A gaff fish hook comprising a frame adapted for securement to a line, a bait hook arranged for sliding movement on the frame, a gaff hook pivoted to the frame, a cam on the bait hook in operative relation to the gaff hook for moving the latter towards the former upon relative sliding movement of the bait hook and frame, and means on the frame to releasably maintain the bait hook in predetermined set relation to the frame.

JOSEPH D. TESSIER.